Sept. 29, 1936.    H. W. MARSHALL    2,055,696
CINEMATOGRAPHIC PROJECTOR
Filed May 9, 1934    3 Sheets-Sheet 1
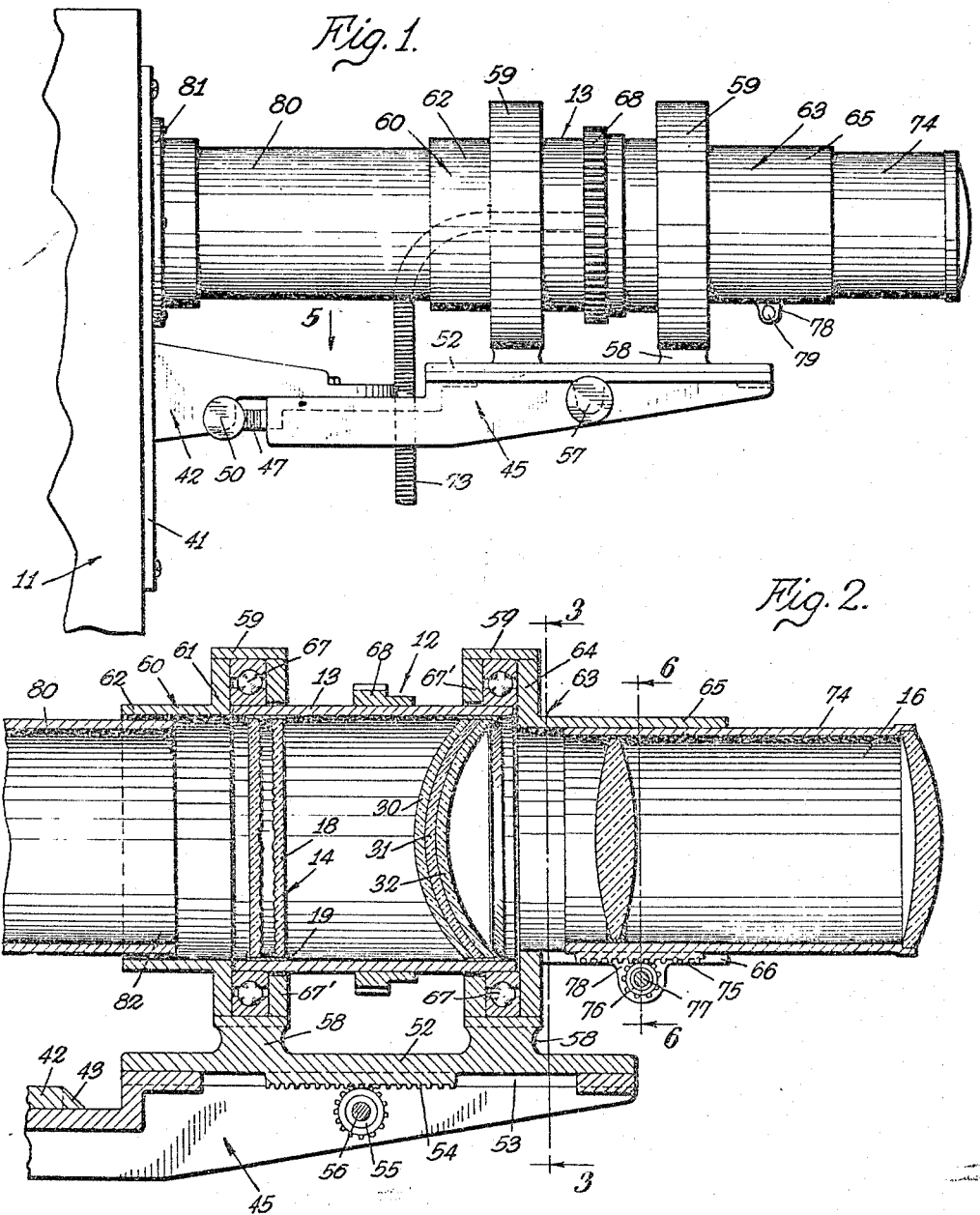
Inventor
H. W. Marshall
By Hazard and Miller
Attorneys.

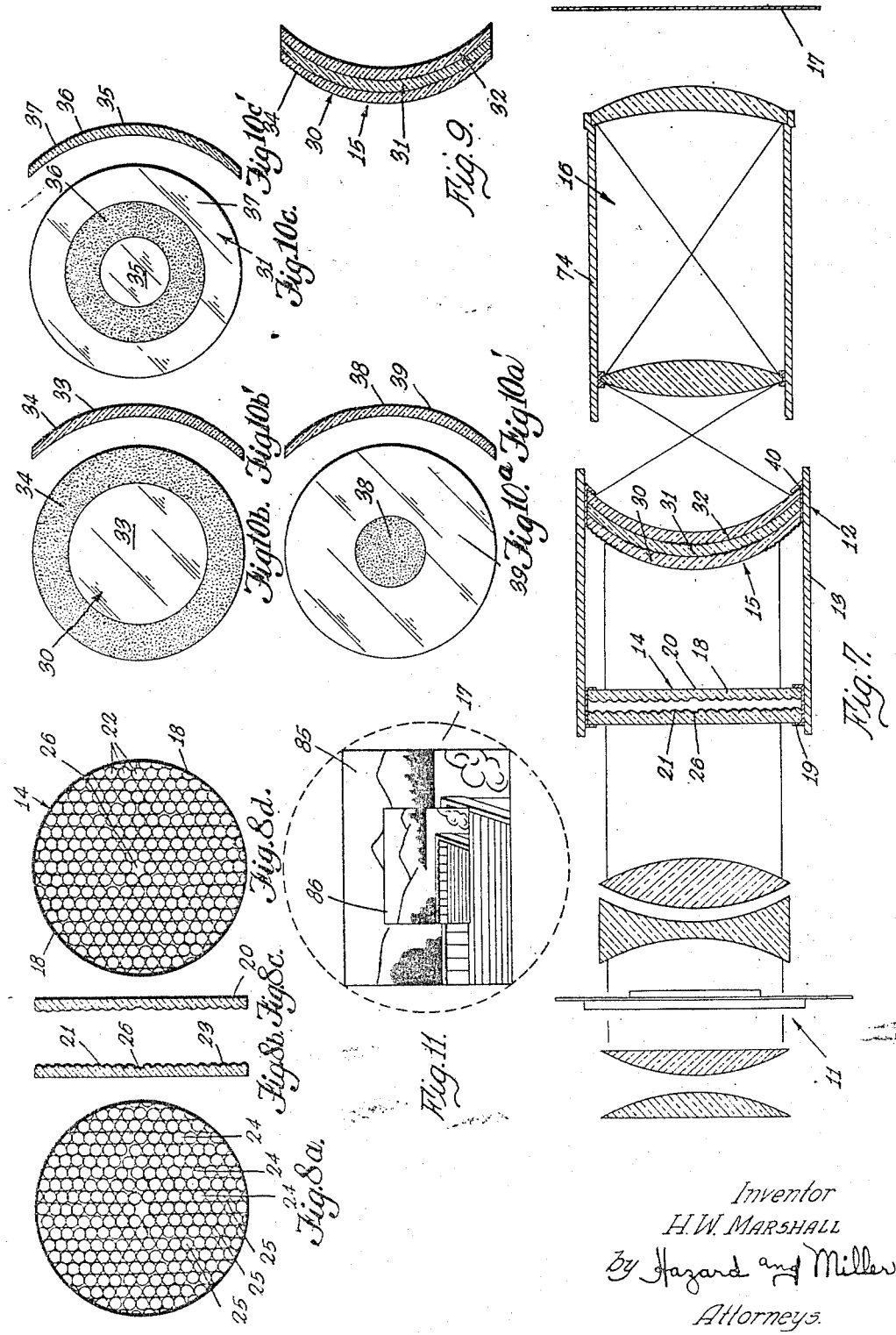

Patented Sept. 29, 1936

2,055,696

UNITED STATES PATENT OFFICE 2,055,696

CINEMATOGRAPHIC PROJECTOR

Harry W. Marshall, Los Angeles, Calif.

Application May 9, 1934, Serial No. 724,723

17 Claims. (Cl. 88—16.6)

My invention relates to an improvement in picture projectors useable either as still pictures or as cinematographic projectors.

Among the various objects of my invention is to reduce the eye strain of an observer of a picture projected on a screen particularly a moving picture, as it has been found that part of this strain is due to the observer endeavoring to interpret a stereoscopic or depth effect in a flat picture on a flat projection screen. It has been observed, for instance, that in the projection of stationary stereoscopic pictures there is less eye strain when viewing a stereoscopic combined picture than when viewing either component of the still stereoscopic picture, and also that where moving pictures have been photographed in such a manner that when projected they give an effect of depth, there is less strain than with the ordinary flat type of projected moving picture.

A more particular object and feature of my invention is in giving a slightly different focus and a movement of all the areas of a projected picture, and to do this so rapidly that the observer does not observe this movement or slight change of focus, but interprets the effect of solidity or three dimensions in the projected picture on a projection screen.

It is to be understood that with my invention pictures taken with an ordinary still picture or motion picture camera may be used without these having any devices or manner of photography designed to obtain the so-called stereoscopic or third dimension effects. With my invention these effects are obtained by the particular improvement in the projector of the adjunct to the standard projector.

A further object and feature of my invention is forming an image of the picture projected from a film which moves intermittently through the projector in the ordinary manner on a ground glass screen mounted in my projecting attachment. The picture as formed on this ground glass screen may be considered as having minute parts of the picture change rapidly and simultaneously in various directions on the ground glass screen and also changed slightly in focus. The picture projected on the projection screen is that of the image formed on the ground glass screen of the projecting attachment.

Another object and feature of my invention consists of rapidly rotating the ground glass screen on the axis of the projection of the picture and at the same time rotating the light changing instrument which moves all of the parts of the projected picture when forming an image on the ground glass screen and also changes their focus.

A further object and feature of my invention relates to the device for giving the movement and slight change of focus of various parts of the whole area of the picture projected from the film and this comprises transparent lens glasses each having a multitude of small lenses thereon. These lens glasses with their minute lens formations are rotated as an assembly on the axis of the projected picture so that all parts of the projected picture are influenced by the rotation of the multitude of minute lenses.

A further detailed feature of my invention relates to forming the lens glasses of preferably two transparent glasses having plain faces on one side and a multitude of minute lenses each preferably formed convex on their exposed surfaces. The minute lenses of each lens plate are positioned opposite one to the other and the axis of each pair of minute lenses is such that an image will be formed on the ground glass image forming screen. In forming the multitude of minute lenses these are made in the manner of protuberances or projections arranged in parallel rows considered across one diameter of the lens plates and in rows forming an acute angle thereto in another direction but preferably the rows of minute projecting lenses do not intersect each other at right angles.

Another object and feature of my invention is forming the ground glass image screen of a plurality of partly spherical-shaped glasses nested together, there being two or more of these in the nest and one of these has the center portion only formed of ground glass and the marginal edges clear. Where two are used, the marginal edge of one is ground glass and the center clear, and when three or more spherical glasses are combined in an assembly, one of these has the center portion ground and the marginal portion clear and others have ground glass rings and one of these has the peripheral portion ground. This forms, as a whole, a ground glass surface, but these surfaces are slightly spaced in the longitudinal axis of the projected picture, the spacing being the thickness of each individual glass.

The assembly of glasses are preferably curved so that the convex side is towards the film, that is, toward the projecting machine and the concave side located toward the projection screen. With my invention I have a rotatable tube mounted in the axis of the picture projector and this tube contains the lens glasses with the multiplicity of individual lenses and also the assembly of the ground glass screens. With this assembly I may use an object glass for correcting the inversion of the image and giving this right side up on the projection screen.

Another object and feature of my invention relates to moving the rotor assembly longitudinally to vary the size of the projected picture and also moving this assembly in a horizontal plane to project the picture varying the position of the picture horizontally on the projection screen.

My invention is illustrated in connection with the accompanying drawings, in which:

Fig. 1 is a side elevation of my projecting attachment located in front of a standard picture projector.

Fig. 2 is a longitudinal vertical section showing the interior of my projection attachment.

Fig. 7 is an optical diagram of the main portions of my device.

Figure 3:
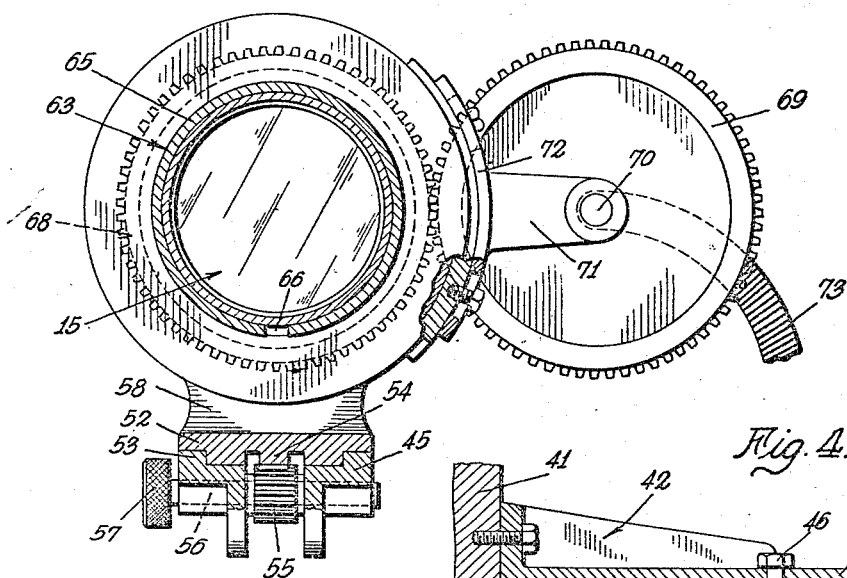
Fig. 3 is a transverse section on the line 3—3 of Fig. 2 in the direction of the arrows.

Fig. 8a is an elevation of one of the lens plates. Fig. 8b is a diametrical section of the same plate. Fig. 8c is an elevation of the complementary lens plate. Fig. 8d is a diametrical section of the plate of Fig. 8c.

Fig. 9 is a diametrical section of the assembly of ground glass screens.

Fig. 10a is an elevation of the innermost section of the screen. Fig. 10a' is a diametrical section of Fig. 10a. Fig. 10b is an elevation of the middle section of the screen. Fig. 10b' is a diametrical section of Fig. 10b. Fig. 10c is an elevation of the outermost section of the screen. Fig. 10c' is a diametrical section of Fig. 10c.

Fig. 11 is an elevation showing a picture projected on the projection screen and illustrating the feature of either enlarging or reducing such picture.

Referring first to Fig. 7, the portion 11 illustrates in diagram, a part of the motion picture projector. This is provided with the usual light source, a feeding means for moving a film intermittently, and a shutter and the necessary lenses. The part designated by the assembly numeral 12 indicates the optical portion of my projecting attachment used with the standard picture projector. In this assembly I provide a rotatable tube 13 which rotates on the optical axis of the light from the projector but may, as hereunder described, be swivelled slightly in a horizontal plane. This tube contains the assembly of minute lenses 14 and the assembly of ground glass screens 15. The image formed on these screens is projected by the source of light in the projector 11 through an object glass assembly of lenses 16, the image being formed on a projection screen 17.

The assembly of minute lens plates 14 as above mentioned is constructed as follows:

I employ a glass plate 18 which is cut circular to fit a holder 19 in the tube 13 and this preferably has a plane surface 20 on one side. The opposite side 21 has a plurality of lens forming protuberances or projections. These are each formed with a circular contour as indicated at 22 (note Figs. 8a, 8b, 8c, 8d), and are convex on their exposed surface as indicated at 23. These protuberances or projecting lenses are formed in rows which extend parallel to a diameter as indicated by the rows 24. The formation develops a second series of rows 25 which are at an acute angle to the rows 24 but are preferably not at right angles thereto.

Two of these transparent plates or glasses having the minute lens formations thereon are mounted parallel one to the other, that is, the plain surfaces 20 are parallel and the faces having the minute convex lenses face each other but are spaced slightly apart. Preferably at the center portion of each plate indicated at 26 the minute lens projections are omitted and at the peripheral edge certain of these minute lenses may be cut off by the ring holder 19.

Each of the lens plates is mounted relative to the other so that the optical path through the axis of each minute lens passes through the optical axis of the minute lens of the plate directly opposite and these are so arranged that the light from the projection machine is focused on the ground glass assembly 15 to form an image of the projected picture on such screen.

The ground glass assembly 15 is illustrated particularly in Figs. 9 and 10a, 10a', 10b, 10b', 10c, 10c' and is built up of three convex-concave glasses 30—31 and 32. The glass 30 has a transparent section 33 of relatively large area and a marginal surface 34 which is ground on the convex surface. The glass 31 has a central transparent section 35, a ground glass ring 36, and a marginal transparent section 37. The glass 32 has a central ground surface 38 and an outer transparent portion 39. The relative sizes of the clear and ground glass surfaces are such that when the three glasses are nested together as shown in Figs. 7 and 9, there is a complete ground glass screen, the ground glass being illustrated by the darkened and irregular surfaces in Figs. 7 and 9. These portions are spaced longitudinally one from another the thickness of the glasses and thus the marginal center and intermediate portion of the image of the projected picture being slightly displaced. These three glasses are mounted in a holder 40 which is secured in any suitable manner in the tube 13.

Figure 4:
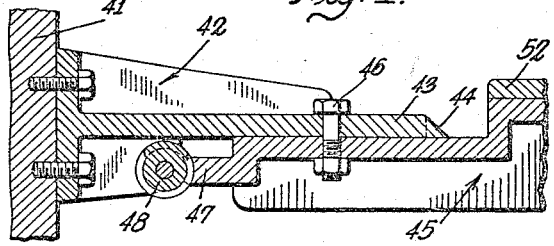
Fig. 4 is a vertical longitudinal section on the line 4—4 of Fig. 5 in the direction of the arrows.
Figure 6:
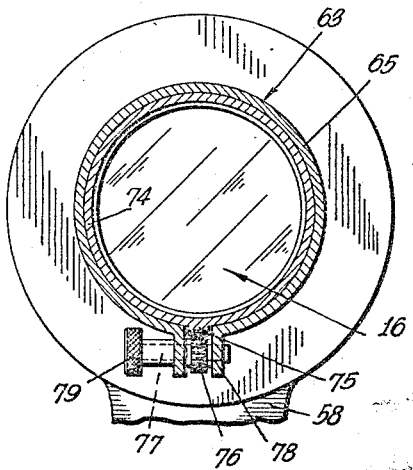
Fig. 6 is a transverse section on the line 6—6 of Fig. 2 in the direction of the arrows through a portion of the object glass assembly.
Figure 5:
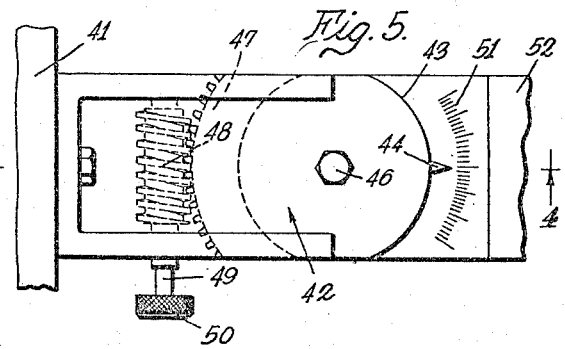
Fig. 5 is a partial plan view taken in the direction of the arrow 5 of Fig. 1 of the vertical pivot for my projection attachment.

The manner of mounting my projection assembly is illustrated in detail in Figs. 1 through 6. In this I show a vertical plate 41 which is mounted on the projection machine 11. A bracket 42 extends outwardly from the plate 41 and has a curved outer end 43 with a pointer 44 thereon. A substantial arm 45 is pivoted on the outer portion of the bracket by means of a pivot bolt 46 and such arm is provided with a segmental worm gear 47 which meshes with a worm 48 on the worm shaft 49 having a knurled head 50, this shaft being journalled in the bracket 42. A series of graduations 51 are made on the upper surface of the inner portion of the arm to register with the pointer 44.

A longitudinally sliding base 52 is mounted on guide tracks 53 which are on the upper surface of the arm 45. This base has a rack 54 on its lower surface with a pinion 55 on the pinion shaft 56, this shaft being journalled in the arm 45 and having a knurled head 57 for rotating the pinion and thus moving the base 52 longitudinally. This base is provided with a pair of bosses 58 to each of which is secured a ring 59. The inner collar 60 is provided with a flange 61 secured to the ring 59 and this has a tube 62 extending towards the picture projector. The outer collar 63 is also provided with a flange 64 secured to the outer ring 59 and this has a tube 65 connected thereto, this tube having a longitudinal guide slot 66. Anti-friction bearings 67 are located inside of each ring 59 and are held in place by rings 67'.

The rotatable tube 13 is mounted inside of these anti-friction bearings and on this ring there is a gear 68. This gear meshes with a complementary gear 69 mounted on a drive shaft 70 which drive shaft is supported on journal arms 71 formed integral with arcuate plates 72, which plates are attached to one side of each of the rings 59. A flexible shaft 73 drives the shaft 70 and hence the gears 69—68 and the tube 13 with the assembly of minute lenses and image screen. The tube 13 is driven at high speed sufficient to make at least one revolution during the exposure of each frame of a moving picture film. The speed, however, may be faster or slightly slower if desired, depending on the number and arrangement of the minute projecting lenses on the lens plate assembly.

The object glass assembly of lenses 16 employs a tube 74 which is slidably mounted in the tube 65 of the collar 63 and this is provided with a rack 75 which engages a pinion 76 on a transverse pinion shaft 77, this shaft being journalled in ears 78 on the tube 65. The pinion shaft has a knurled head 79 by which the object glass assembly may be moved longitudinally in reference to the rotatable tube 13.

A fixed tube 80 is attached by angular collars 81 to the plate 41 and receives the light projected from the standard projecting machine. The inner end 82 of the tube 80 extends within the tube 62 of the inner collar 60.

The manner of operation of my invention so far described is as follows:

The projected picture from the projector may be focused on the ground glass screen assembly 15 and in order to obtain accurate focusing, the tube 13 may be shifted longitudinally on the arm 45. The light to form this image passes through the lens assembly 14 having the minute lenses thereon. Therefore, minute portions of the whole image on the image screen 15 are formed by the individual minute lenses on the lens plates 18. As these lens plates are rapidly revolving there is a continual minute change not only of position but of focus of the minute sections of the image formed on the image screen, but these changes are so rapid that they cannot be individually detected by the eye. The image may be formed in an inverted position on the image screen and changed by the object lens assembly 16 to an upright position when projected on the projecting or viewing screen 17. The picture projected on this screen 17 thus conforms to all the minute rapid changes of the image on the image screen assembly 15 and creates in the mind of the observer the effect of depth or three dimensions in the projected picture.

The center portion 26 of the lens plates does not have the lens protuberances. These are formed of the proper surface to form an image on the center portion of the projected picture on the image screen 15.

In Fig. 11 I illustrate two sizes of pictures designated 85 and 86. These are shown projected on a portion of the projection screen 17. The same picture is illustrated as of two different sizes in order to indicate that the size of the picture on the projection screen may be changed by merely moving the optical portion 12 including the tube 13 and the object glass assembly 16 on the supporting arm 45. This changes the size of the picture on the image screen 15 and thus the size of the picture on the projection screen.

The vertical pivot 46 (note Fig. 5) is for the purpose of allowing slight horizontal movement of the optical assembly having the rotary tube 13 and the object lens assembly 16. As this may be moved slightly in a horizontal plane, it allows changing the position of the picture horizontally on the projection screen and if desired, the position of the picture may be changed while it is being projected.

A characteristic feature of my invention as it relates to the lens assembly having the minute lenses formed on the faces of glass plates, is that the minute lenses form minute images which are all brought to a focus on substantially the same focal plane. Therefore, when the lens assembly rotates substantially all of the portions of the projected picture may be considered as scanned rapidly by various minute lenses or pairs of these lenses. This gives a changing effect to each and every part of the projected picture.

This projected picture is formed on the screen assembly 15 having the ground glass screen and a projection light projects this image on the projection screen. It is not necessary that the image screen be rotated but it is a convenient manner of arrangement and assembly to have this rotatable with the lens assembly in order to maintain the image screen and the lens assembly in relative fixed positions.

It will be noted, by the arrangement of the minute lenses shown in Figs. 8a, 8b, 8c, 8d, that these are so positioned relative one to the other that in the rotation of the lens plates, light from all portions of the projected picture except through the center, if the center has any minute lenses, is acted upon by a minute lens optical system.

Various changes may be made in the details of construction without departing from the spirit or scope of the invention as defined by the appended claims.

I claim:

1. In a cinematographic projector, a lens assembly having a glass plate with a large number of minute lenses on one side, means to rotate said plate on its axis, the said lenses being positioned relative one to another to scan substantially all of the projected picture and all of the minute lenses, being constructed to form an image substantially in the same optical plane, an image forming screen combined with the lens assembly and rotatable therewith, the image being formed on the image screen and means to focus the image from the image screen on to a projection screen.

2. In a cinematographic apparatus, a lens assembly having a pair of glass plates each plate on one side having a large number of minute lenses on the inner side, an image screen connected to the lens assembly means to rotate the lens assembly and screen on its axis, the minute lenses being positioned to scan substantially all parts of a projected picture, and minute lenses on each plate having the characteristic of forming a large number of images merging on the rotatable image screen.

3. In a cinematographic projector, the combination of a picture projector, a lens assembly having a glass plate plane on one side and with a large number of minute lenses on the other side, means to rotate the lens assembly on its axis, the minute lenses being located to scan substantially all of the picture projected, a rotatable image forming screen, the minute lenses having the characteristic of forming merging images on the image screen, a projection screen, and an optical system for projecting the image from the image screen on to a projection screen.

4. In a cinematographic projector, a lens assembly having a lens plate with a large number of minute individual lenses thereon, a convex-concavo image screen slightly ground on the convex face and polished on the concave face, means for projecting an image through the lens assembly on to the image screen, means for rotating the lens assembly on its axis to cause a lateral displacement of the image on the image screen during such rotation, and an optical system for projecting the image on a projection screen.

5. In a cinematographic projector, a convex-concavo image screen slightly ground on the convex surface and polished on the concave surface, a lens assembly having a lens plate plane on one side and with a large number of similar minute lenses on the opposite side, means for rotating the image screen and the lens assembly on their optical axis, means for projecting a picture through the lens assembly to form an image on the image screen, the minute lenses having an offset relation one to the other to cause a lateral displacement of the image projected on the image screen, and an optical system for projecting said image on a projection screen.

6. In a cinematographic projector, a concavo-convex image screen, a lens assembly having a lens plane on one surface and with a large number of minute similar lenses on the opposite side, a number of lenses being arranged eccentric to the center of the lens, the minute lenses forming merging images on said screen, and means to rotate the lens assembly and image screen on its axis.

7. In a cinematographic projector, a convex-concavo screen formed of a plurality of similar screen elements each partly ground on its convex surface, the assembly forming a complete ground surface, a projector for projecting an image from the ground surfaces of the screen, and an optical system for projecting the image on a projection screen.

8. In a cinematographic projector, a convex-concavo image screen, the convex surface of which is slightly ground and the concave surface polished, a picture projector, the convex surface being toward said projector, means for forming an image on said screen to produce a lateral displacement of the image, and an optical system for projecting said image on a projection screen.

9. In a cinematographic projector, the combination of a picture projector, an image screen, means to form an image on said screen, an optical system for projecting the image on a projection screen, and means for laterally moving the image screen and said optical system on a pivot adjacent the end of the picture projector.

10. In a cinematographic projector, an image screen having a plurality of convex-concavo screen elements nested together and having complementary parts ground and other complementary parts clear, and means to form an image on the convex side of the assembled screen.

11. In a cinematographic projector, an image screen formed of a plurality of convex-concavo glasses nested together and arranged with each glass having a portion ground and the remaining portion clear on the convex side whereby the assembly of glasses presents a ground glass image forming screen combined with a picture projector to form an image of a picture on the said screen assembly, the light of the picture projector being adapted to project the image on a projection screen.

12. In a cinematographic apparatus, an image forming assembly including a ground glass screen convex-concavo in cross section with the convex side towards the picture being projected, and an optical means mounted for rotation with the said screen on the axis of the screen, said optical means having the characteristic causing displacement of portions of the image in forming the image, and means to project the image so formed on a projection screen.

13. In a cinematographic apparatus, the combination of an image forming assembly comprising a convex-concavo screen having a ground exposed surface for forming an image thereon, and an optical structure having a multitude of facets, means for rotating the said assembly on the optical axis, the said facets being offset laterally relative to the axis of rotation, and an optical system for picking up the image from the screen for further projection onto a projection screen, the said offset relation of the facets causing lateral displacement of the image projected during rotation of the screen.

14. In a cinematographic apparatus in which a picture projector is utilized, an image forming screen assembly having an optical means with a plurality of facets, means for rotating the screen and the said optical means on the optical axis whereby an image received and formed on the screen is moved in a circuitous path.

15. In a cinematographic apparatus, the combination of a convex-concavo image forming screen, means for projecting an image on the surface of said screen, an objective lens system for picking up the image received upon said screen and in turn projecting it upon a further member, an optical device having a plurality of facets formed on its surface, means to rotate the screen and the optical device on the optical axis, the said facets being arranged in an eccentric manner to cause lateral displacement of the image received upon the screen during rotation thereof.

16. In a cinematographic apparatus, a projection means for forming an image from a picture combined with a convex-concavo screen upon which such image is projected, said screen being formed to pass light therethrough, an optical lens system for picking up light from said screen for further projection upon a view screen, an optical device associated with said screen and being formed to cause lateral displacement of the light rays projected thereon, and means for rotating the screen and the optical device to cause said lateral displacement of the image to move in a circuitous path.

17. In a cinematographic apparatus, a convex-concavo screen formed of a plurality of similar elements each having a partially ground surface, an optical device having facets offset relative to the axis of rotation, means rotating the screen and the optical device as a unit on their optical axes, means for projecting an image through the optical device onto the said ground surfaces of the screen and an optical system for picking up said image from the screen for further projection.

HARRY W. MARSHALL.